United States Patent
Huth et al.

(10) Patent No.: US 8,616,517 B2
(45) Date of Patent: Dec. 31, 2013

(54) TURBOMACHINE FOOT UNIT

(75) Inventors: Sebastian Huth, Mönchengladbach (DE); Marcus Meyer, Duisburg (DE); Wolfgang Zacharias, Duisburg (DE)

(73) Assignee: Siemens Aktiengesellschaft, München (DE)

(*) Notice: Subject to any disclaimer, the term of this patent is extended or adjusted under 35 U.S.C. 154(b) by 32 days.

(21) Appl. No.: 13/140,129

(22) PCT Filed: Dec. 22, 2009

(86) PCT No.: PCT/EP2009/067776
§ 371 (c)(1),
(2), (4) Date: Aug. 29, 2011

(87) PCT Pub. No.: WO2010/072780
PCT Pub. Date: Jul. 1, 2010

(65) Prior Publication Data
US 2011/0297812 A1    Dec. 8, 2011

(30) Foreign Application Priority Data
Dec. 22, 2008   (DE) .................. 10 2008 064 371

(51) Int. Cl.
*F16M 7/00* (2006.01)

(52) U.S. Cl.
USPC ... 248/677; 248/637; 248/188.1; 248/346.01; 415/213.1

(58) Field of Classification Search
CPC ...... F01D 17/162; F01D 17/165; F10D 25/28
USPC ........ 248/677, 678, 671, 188.1, 188.8, 188.9, 248/346.01, 615, 616, 637; 415/213.1
See application file for complete search history.

(56) References Cited

U.S. PATENT DOCUMENTS

| | | | | |
|---|---|---|---|---|
| 1,511,336 A | * | 10/1924 | Hoey | 248/656 |
| 2,128,805 A | * | 8/1938 | Doran | 248/637 |
| 3,799,482 A | * | 3/1974 | Bellati et al. | 384/428 |
| 4,050,660 A | | 9/1977 | Eggmann | |
| 4,076,452 A | | 2/1978 | Hartmann | |
| 4,732,519 A | * | 3/1988 | Wagner | 411/337 |
| 5,108,258 A | | 4/1992 | Gros | |
| 5,810,558 A | | 9/1998 | Streeter | |
| 6,354,558 B1 | * | 3/2002 | Li | 248/615 |
| 7,229,061 B2 | * | 6/2007 | Battig et al. | 248/677 |

FOREIGN PATENT DOCUMENTS

| | | |
|---|---|---|
| CN | 1046783 A | 11/1990 |
| CN | 1444689 A | 9/2003 |
| DE | 699825 | 12/1940 |
| DE | 4422512 C1 | 3/1996 |
| EP | 1176286 A1 | 1/2002 |
| EP | 2090756 A1 | 8/2009 |
| WO | WO 9853183 A1 | 11/1998 |

* cited by examiner

*Primary Examiner* — Anita M King

(57) ABSTRACT

A turbomachine foot unit with a plurality of feet is provided. The plurality of feet is fastened to a turbomachine. The turbomachine stands upright on a horizontal base. The turbomachine foot includes fastening devices for fastening the feet to the base. At least one of the feet is mounted in a horizontally moveable manner relative to one of the fastening devices fastening the foot to the base.

13 Claims, 4 Drawing Sheets

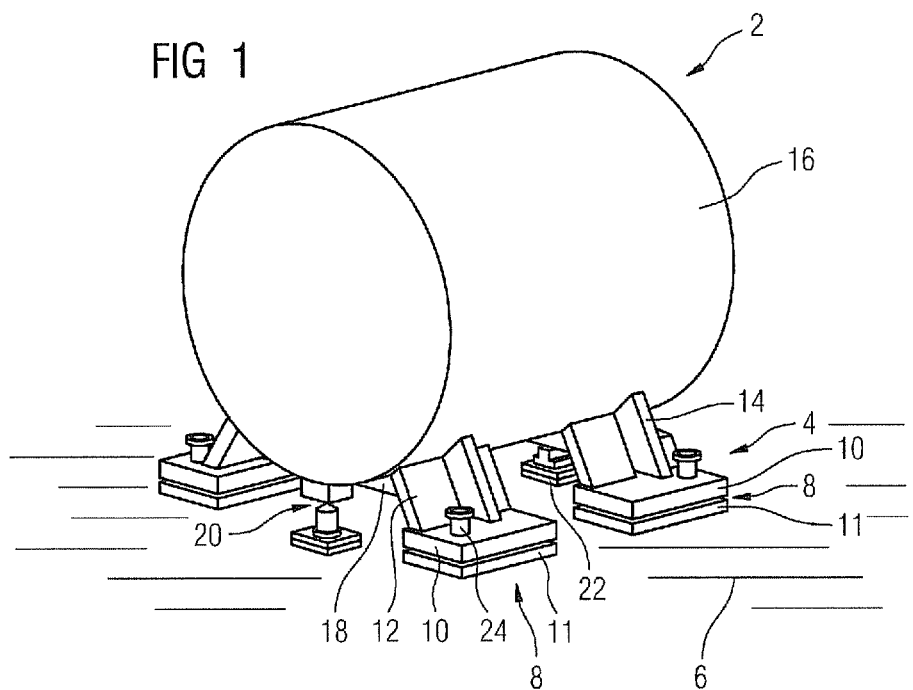
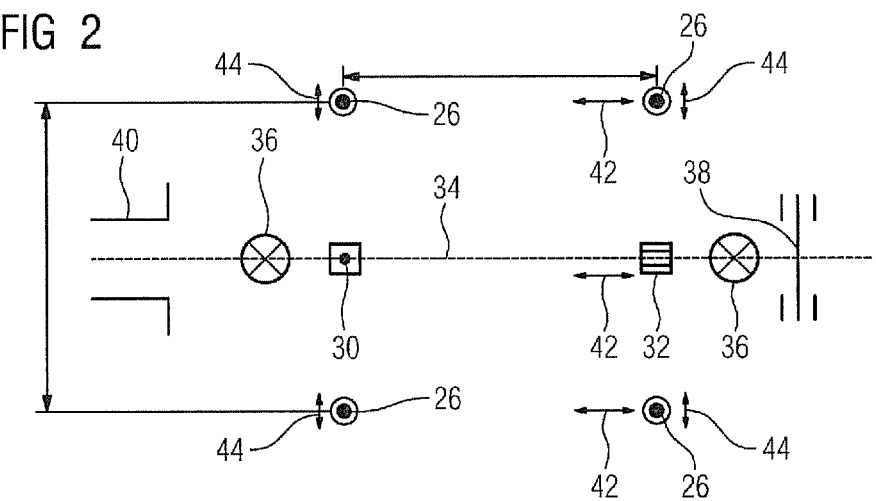

TURBOMACHINE FOOT UNIT

CROSS REFERENCE TO RELATED APPLICATIONS

This application is the U.S. National Stage of International Application No. PCT/EP2009/067776 filed Dec. 22, 2009, and claims the benefit thereof. The International Application claims the benefits of German Patent Application No. 10 2008 064 371.8 DE filed Dec. 22, 2008. All of the applications are incorporated by reference herein in their entirety.

FIELD OF INVENTION

The invention relates to a turbomachine foot unit with a plurality of feet for fastening to a turbomachine and for standing the turbomachine on a horizontal base and with fastening means for fastening the feet to the base, with the turbomachine fastened on the base at least one of the feet being mounted so as to be horizontally movable in relation to one of the fastening means which fastens the foot to the base.

BACKGROUND OF INVENTION

Turbomachines for industrial purposes or in power stations are often connected to an electrical machine, for example a turbocompressor is connected to an electric motor for driving the turbocompressor or a turbine is connected to a generator for the transmission of force from the turbine to the generator. So as not to subject the connecting shaft to excessively high load when force is transmitted between the machines, such a turbomachine is usually fastened on a base, for example a foundation or base frame. The turbomachine rests on this so as to be firmly fixed during operation, the firm fixing also counteracting vibrations of the turbomachine.

To fasten the turbomachine on a base, it is known to place the turbomachine on feet which are screwed firmly to the base. The feet are themselves connected to the turbomachine, for example welded or cast in one piece with a housing element, so that the turbomachine is firmly anchored in the base.

EP 1 176286 A1 already discloses a turbocharger with symmetrical long hole fastening. U.S. Pat. No. 4,076,452 A, U.S. Pat. No. 5,108,258 A and WO 98/53183 A1 show turbines with various bearer constructions.

SUMMARY OF INVENTION

An object of the present invention is to specify a turbomachine foot unit, by means of which a turbomachine for industrial or power station use can be anchored securely to a base.

This object is achieved by means of a turbomachine foot unit of the type initially mentioned, in which, according to the invention, with the turbomachine fastened at the base, at least one of the feet is mounted so as to be movable horizontally in relation to one of the fastening means which fastens the foot to the base.

The invention in this case proceeds from the consideration that a turbomachine becomes hot while it is in operation, the heat being distributed unevenly in the volume of the turbomachine. For example, in the case of an air compressor, the air compressed to an increasingly greater extent from stage to stage becomes warmer, so that the turbomachine is relatively cool at the air inlet and is hot at the outlet of the compressed air. As a result of the heat, the turbomachine as a whole expands, with the result that stresses and deformations are transferred to feet fixed firmly to the base. In the case of a frequent change in temperature of the turbomachine, the feet or the foot unit of the turbomachine therefore experience fatigue, and because of this material fatigue is hazardous to secure fastening to the base. Owing to the movability of at least one of the feet in relation to the horizontal base or to a fastening means fixed to the base, the corresponding foot can participate in length compensation, so that the mechanical load on this foot is reduced, as compared with firmly fixed feet.

The base may be a foundation. A base frame, intermediate plate or the like may also be a base, these then expediently being fastened firmly to the foundation or ground, that is to say are immovable with respect to the ground. The feet serve for fastening to the turbomachine and are expediently fastened, for example welded, to it. In the case of a turbomachine fastened on the base, it is expediently fastened to the base for the purpose of carrying out its regular operation. The turbomachine may be a turbocompressor or a turbine and is intended, in particular, for a power output of at least 100 kW, in particular at least 500 kW. There may be any number of feet. Four movable feet are advantageous, more movable feet or, for example, two movable and two immovable feet also being conceivable.

Movability is expediently movability along the base. Movability may be one-, two- or three-dimensional movability, although the second and/or third dimension must not be a horizontal dimension.

In an advantageous embodiment of the invention, at least two of the feet are mounted so as to be horizontally movable independent of one another in relation to the fastening means. As a result, they can adapt their position especially flexibly even to a complex thermal expansion behavior of the turbomachine. Independent movability is afforded when one foot is movable, without forced movement of another foot consequently taking place.

A sliding arrangement, for example of the foot over the base, is sufficient for movable mounting. Movability may be facilitated by a movement aid, for example a surface or track which is provided for especially low-friction sliding of two components one on the other, for example by an especially smooth surface or a lubricant.

Movability between the movable foot and its fastening means can be achieved in an especially simple way by play between the fastening means and the feet. Relative movement can take place one-, two- or three-dimensionally within this play.

Advantageously, the movable foot comprises a foot plate with a recess, through which is led a fastening means which is assigned to the foot and which fastens the foot to the base, the foot plate being moved in relation to the fastening means in the event of horizontal movement of the foot. The horizontal size of the recess thus permits the horizontal movability of the feet. The recess is expediently surrounded completely by the foot plate. The fastening means may be a screw which is screwed in the base. Its screw head can directly or indirectly fix the foot plate vertically.

The fastening means especially advantageously comprises a sleeve with a collar, said sleeve surrounding the screw. The collar can thereby fix the foot plate vertically, so that, independently of manufacturing accuracies of the screw, a uniform apportionment of force to the foot plate for the purpose of fixing the foot plate can be achieved.

Moreover, the sleeve can limit a pressure force of the screw upon the foot plate, for example in that said sleeve bears part of the pressure force of the fastening means on the base. As a result, the clamping force which the screw exerts on the foot plate, independently of the tightening force of the screw, can be adjusted to a maximum value which allows horizontal movement of the foot plate over the base, without excessive frictional force having to be overcome. Expediently, the length of the sleeve as far as the collar is equal to the thickness of the foot plate between the base and the collar or a collar support of the foot plate.

To facilitate the horizontal movement of the feet, a friction-reducing means, for example a viscous lubricant or Teflon, may be introduced between the collar and foot plate. The same applies to a connection between a foot plate and a foundation or ground.

In a further advantageous refinement of the invention, the turbomachine foot unit comprises a fixing means fastened on the base, for fixing part of the turbomachine at a horizontal fixed point against horizontal movement. The horizontal movement of the turbomachine permitted by the feet can thereby be restricted, so that, for example, a shaft connection to an electrical machine is not subjected to excessively high mechanical loads.

What may be understood as being a horizontal fixed point is a point or location, for example on the turbomachine, at which horizontal movability is prevented. Thus, at the horizontal fixing point, fixing takes place in all horizontal directions. The fixing means may be a shaped-out portion, for example a bolt, which is fastened to the base and which engages into a corresponding recess on the turbomachine or on the foot unit, or vice versa, so that a shaped-out portion on the turbomachine or foot unit engages into a recess fastened to the base.

Expediently, the movable foot and, in particular, all the movable feet are mounted so as to be movable away from the horizontal fixed point and toward the horizontal fixed point, for example in a star-shaped manner, so that expansion of the turbomachine away from the fixed point can be converted into a corresponding movement of the feet.

The turbomachine is fixed perpendicularly to the base by means of the feet. In order to allow thermal expansion, for example in the vertical direction, the fixing means advantageously allows vertical movement of the turbomachine. Overdetermined fixing can thereby be avoided.

The fixing means advantageously lies in a vertical mid-plane which runs through a rotor shaft of the fastened turbomachine. A horizontal position of the shaft of the turbomachine can thereby be fixed, so that, in the event of thermal expansion of the turbomachine, the shaft is subjected to only slight mechanical load. To the same advantage, the fixing means is arranged on a side of the turbomachine which faces a drive, for example an electric motor for driving the turbomachine designed as a compressor, or which faces a generator in the case of a turbine.

It is proposed, furthermore, that the turbomachine foot unit comprise a guide means fastened to the base, for restricting the horizontal movement of part of the turbomachine to one-dimensional movement. The guide means may be a center guide chock which serves as a radial fixed point for preventing a rotation of the turbomachine in the horizontal. A load on the shaft can be kept low.

For this purpose, the one-dimensional movement is expediently directed in a shaft direction parallel to a rotor shaft of the fastened turbomachine. Moreover, it is advantageous if the guide means lies in a vertical mid-plane which runs through a rotor shaft of the fastened turbomachine. In order to keep load upon the shaft in the shaft direction low, in particular at a connection to an electrical machine, it is advantageous if the guide means is arranged on a side of the turbomachine which faces away from the drive.

Moreover, the invention is aimed at a turbomachine with a turbomachine foot unit, as described above.

BRIEF DESCRIPTION OF THE DRAWINGS

The invention is explained in more detail by means of exemplary embodiments illustrated in the drawings in which:

FIG. 1 shows a perspective diagrammatic illustration of a turbomachine and of a turbomachine foot unit fastened to it and having four feet, FIG. 2 shows a fixing diagram in the form of a view of the base from above.

DETAILED DESCRIPTION OF INVENTION

Figure 3:
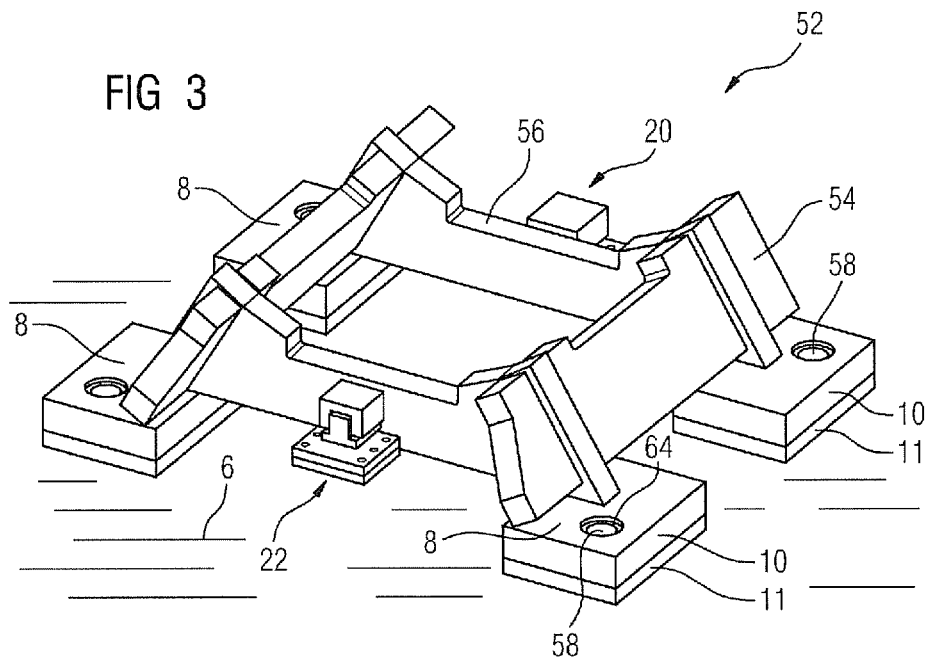
FIG. 3 shows a further turbomachine foot unit in a perspective view.

FIG. 1 shows a turbomachine 2 in a diagrammatic perspective illustration, with a turbomachine foot unit 4 which is welded to a housing 16 of the turbomachine 2. The turbomachine foot unit 4 stands on a base 6, indicated in FIG. 1, which extends horizontally and comprises a planar foundation and, on each foot 8, a foot plate 11. The turbomachine foot unit 4 comprises four feet 8, each with a foot plate 10 and with two foot panels 12, 14 which stand perpendicularly to one another and are welded to the housing 16 of the turbomachine 2. The two foot panels 12, 14 are welded to the foot plate 10 at their end lying opposite the turbomachine 2. In each case two feet 18 are connected to one another in each case via a transverse panel 18. It is likewise conceivable that in each case two foot panels 14 and one transverse panel 18 are produced in one piece and the foot panels 12 are in two parts and are welded to a foot panel 14 on both sides.

Figure 4:
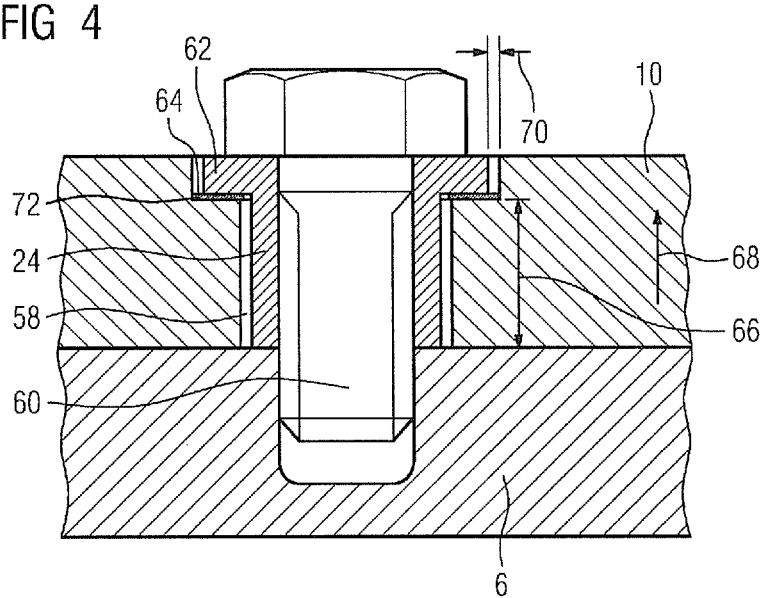
FIG. 4 shows a sectional illustration through a foot of the turbomachine foot unit from FIG. 3, FIG. 5 and FIG. 6 show respectively a sectional illustration and a top view of a center guide chock of the turbomachine foot unit from FIG. 3, FIG. 7 and FIG. 8 show respectively a sectional illustration of the top view of a center guide bolt of the turbomachine foot unit from FIG. 3.
Figure 5:
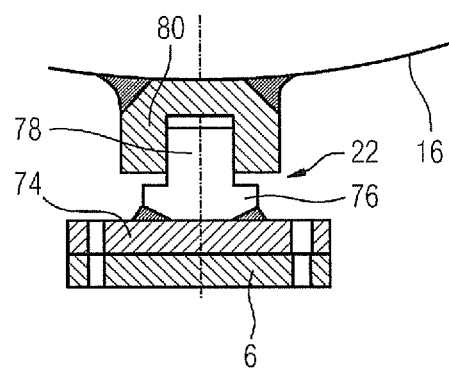
Figure 6:
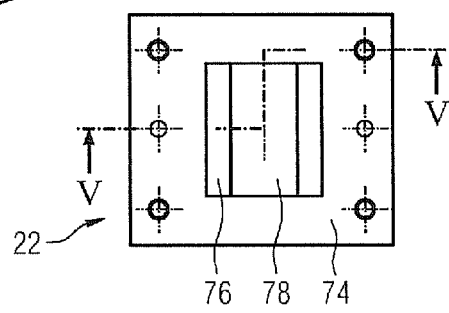
Figure 7:
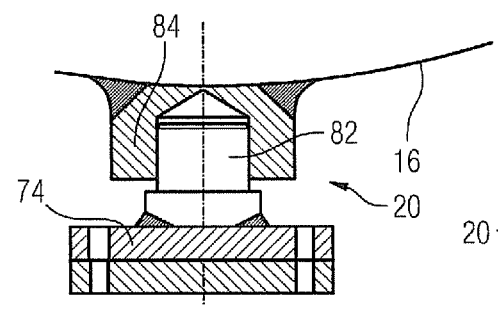
Figure 8:
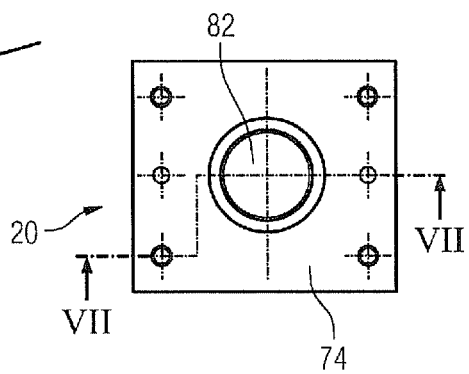

Moreover, FIG. 1 illustrates in the manner of an exploded drawing a fixing means 20, shown in more detail in FIGS. 7 and 8, and also a guide means 22, illustrated in more detail in FIGS. 5 and 6, and, for each foot 8, in each case a sleeve 24 which is shown larger in FIG. 4.

FIG. 2 shows a fixing diagram of the turbomachine 2 on the base 6 or its intermediate plates 11. What are illustrated are four fastening locations 26 for the feet 8 on the base 6, a fixing point 30 defined by the fixing means 20, and a guide region 32 which is defined by the guide means 22. Moreover, a dashed line indicates a shaft 34 of a rotor of the turbomachine 2, said shaft being mounted by means of two shaft radial bearings 36 and one shaft axial bearing 38. Also indicated is a coupling 40 to a drive, not illustrated, for example an electric motor in the case of a turbomachine 2 designed as a compressor.

The fixing means 20 is placed vertically below the rotor shaft 34, so that the latter is arranged in a vertical mid-plane which runs perpendicularly with respect to the paper plane and runs through the rotor shaft 34 of the fastened turbomachine 2.

As explained in more detail with reference to the following figures, the feet 8, in the state fastened on the base 6, are movable in the horizontal longitudinal direction 42 and horizontal transverse direction 44 or only in the horizontal transverse direction 44, so that they essentially participate in a thermal expansion or contraction movement of the turbomachine 2, and therefore a shear force on the feet 8 or on the foot panels 12, 14 and their welded joints and also on the fastening means 60 (FIG. 4) remains low. The horizontal longitudinal direction 42 is parallel to the longitudinal direction of the rotor shaft 34 of the turbomachine and the horizontal transverse direction 44 is transverse to the longitudinal direction of the rotor shaft 34.

By the fixing means 20, the turbomachine 2 is fixed, on its side facing the coupling 40, at the bottom at the fixing point 30 in all horizontal directions 42, 44, so that movement of the turbomachine 2 in all horizontal directions 42, 44 is prevented there. However, movement perpendicular to the horizontal directions 42, 44, that is to say perpendicularly to the base 6, is possible, so that the turbomachine 2 can participate in thermal expansion of the foot panels 12, 14 without stresses.

When the turbomachine 2 is in operation, it heats up, and therefore its housing 16 expands thermally. Expansion takes place in all three spatial directions. Since the turbomachine 2 is held by the turbomachine foot unit 4 from below only, the fixing of the turbomachine 2 on the base 6 generates no mechanical stresses in the turbomachine 2 in the vertical direction or perpendicularly to the base. However, as a result of the expansion of the turbomachine 2 in the horizontal directions 42, 44, stresses would act upon the feet 8 if these were fixed firmly to the base 6.

With only the horizontal directions 42, 44 being considered, the turbomachine 2 is fixed at the fixing point 30 by the fixing means 20. This point on the turbomachine 2 is therefore stationary during all horizontal expansion movements. This is contrary to the feet 8 which are pushed away from the fixing point 30 as a result of thermal expansion of the turbomachine 2. The two feet 8 adjacent to the fixing means 20 therefore move away from the fixing point 30 in the horizontal transverse direction 44 and, in the event of thermal contraction, toward the fixing point 30. The two feet 8 located further away move about the fastening location 26 both in the horizontal longitudinal direction 42 and in the horizontal transverse direction 44. The guide means 22 prevents movement of the turbomachine 2 in the guide region 32 in the horizontal transverse direction 44 and permits only the movement in the horizontal longitudinal direction 42. As a result, a rotational movement of the turbomachine 2 about the fixing point 30 is prevented and therefore the mechanical load on the shaft 34 or coupling 40 is kept low.

FIG. 3 shows an alternative turbomachine foot unit 52, without a turbomachine 2 placed on it, in a perspective illustration. The description of the following figures is restricted essentially to the differences with respect to the exemplary embodiment from FIG. 1, to which reference is made with regard to features and functions which remain the same. Components which essentially remain the same are basically designated by the same reference symbols and features not mentioned are adopted in the following exemplary embodiments, without being described again.

In contrast to the turbomachine foot unit 4, the turbomachine foot unit 52 comprises foot panels 54 connecting two feet 8 to one another, and continuous transverse panels 56 which at their two outer ends likewise form foot panels welded to the foot panels 54. The foot panels 54 and transverse panels 56 are themselves welded to the feet 8.

In FIG. 3, recesses 58 in the foot plates 10 can be seen, which are set up in FIG. 4 in a sectional view. The sleeves 24 are inserted into these recesses 58 for fastening the turbomachine foot unit 52 on the base 6, the fastening means 60 designed in each case as a screw being led through said sleeves. The fastening means 60 is screwed to the base 6 and thus presses the sleeve 24 onto the base 6. The pressure force may in this case be low. It is important merely to have fixing in the vertical direction.

The sleeve 24 comprises at its outer end a collar 62 which, on the one hand, forms a support for the screw head and, on the other hand, partially covers a shoulder 64 of the recess 58 and therefore lies inside the recess 58 on the foot plate 10. The length 66 of the sleeve 24 from its lower end as far as the collar 62 is in this case selected such that it is equal to the thickness of the foot plate 10 from the base 6 as far as the shoulder 64. By the sleeve 24 being braced on the base 6, the foot plate 10 is also thus secured against movement in the vertical direction 68 away from the base 6. However, the foot plate 10 is free in terms of its movement in the horizontal directions 42, 44, insofar as the recess 58 is larger in its diameter by double the length 70 than the diameter of the sleeve 24 in its lower region or in the region of the collar 62. By virtue of this play, all the foot plates 10 can be moved in both horizontal directions 42, 44 and in all horizontal directions lying between them, the feet 8 being horizontally movable independent of one another.

In this case, only the friction of the foot plate 10 on the base 6 and between the foot plate 10 and the collar 62 has to be overcome. To reduce this friction, a lubricant 72 for example in the form of a TEFLON® (PTFE)-ring or TEFLON® (PTFE)-film is introduced between the collar 62 and the shoulder 64 of the foot plate 10. If the fastening means 60 fastens a foot 8 only to an intermediate plate 11 of the base 6 and horizontal movement between the intermediate plate 11 and foundation or ground is possible, the lubricant may be arranged between the intermediate plate 11 and ground or, in general, between two elements movable horizontally with respect to one another, one being fastened to the foot 8 and the other to the base 6.

FIG. 5 shows a guide means 22 in the view in horizontal longitudinal direction 42 and FIG. 6 shows a top view of that part of the guide means 22 which is fastened on the base 6. A guide chock 76 is welded on a base plate 74 screwed to the base 6 or the intermediate plate 11 and has a shaped-out portion 78 which is of elongate form in the horizontal longitudinal direction 42. A guide 80 welded to the housing 16 bears on both sides in the horizontal transverse direction 44 against this shaped-out portion 78 which forms a kind of guide rail, so that the guide 80 and, with it, the turbomachine 2 are prevented from movement in the horizontal transverse direction 44 in the guide region 32. Movement in the horizontal longitudinal direction 42 is guided by the rail-like shaped-out portion 78.

Similarly to FIGS. 5 and 6, FIGS. 7 and 8 show the fixing means 20 in a lateral illustration and in a top view. A bolt 82 is plugged into a recess in a guide 84 on the housing 16 and thus blocks movement of the turbomachine 2 at the fixing point 30 in all horizontal directions 42, 44. However, as in the case of the guide means 22, movement in the vertical direction 68 is maintained. Although rotational movement of the turbomachine 2 about the fixing point 30 is not blocked by the fixing means 20 on account of the rotationally symmetrical design of the bolt 82 and recess in the guide 84, this rotational movement is nevertheless blocked by the guide means 22, as described.

Figure 9:
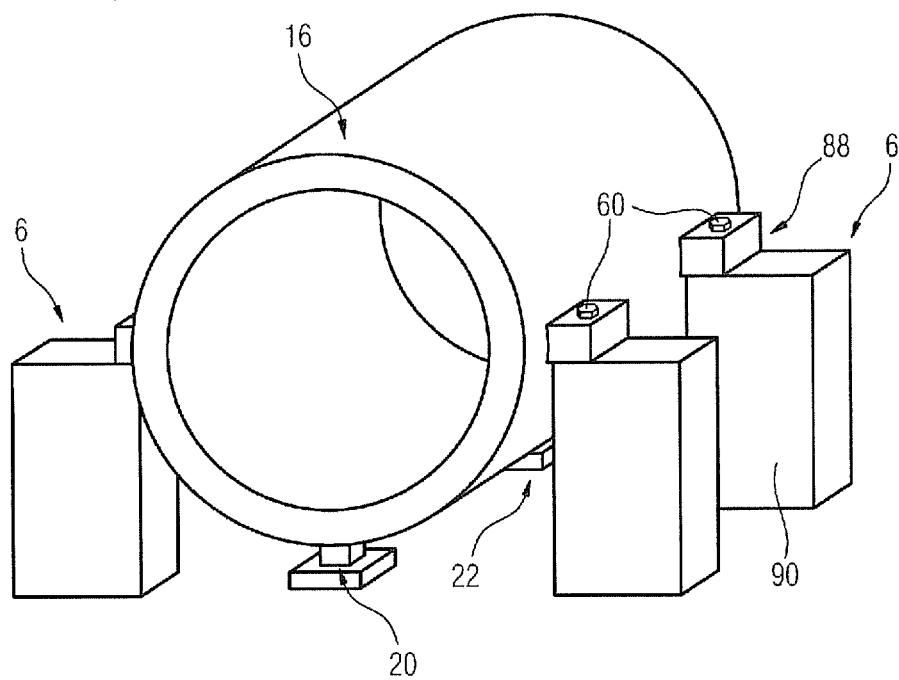
FIG. 9 shows a turbomachine foot unit on a raised base.

FIG. 9 shows a further exemplary embodiment having a turbomachine foot unit 86 with feet 88 in which a horizontal sliding plane between a foot 88 and a base 6 lies vertically level with a shaft of the turbomachine. For this purpose, the base comprises chocks 90 which raise the base 6 to this sliding plane and which can be stiffened in a stable manner with respect to one another in the horizontal direction. Center guidance by the fixing means 20 and guide means 22 is maintained. However, thermal expansion not only causes movement of the components of the turbomachine upward, but also uniformly upward from the machine axis, which lies in the middle of the machine shaft, and downward away from the feet 88 or the sliding plane between the feet 88 and base 6. The machine shaft therefore remains in its position, both vertically and horizontally, and no appreciable error of alignment occurs due to thermal expansion.

The invention claimed is:

1. A turbomachine foot unit, comprising:
a plurality of feet being fastened to a turbomachine, the turbomachine standing on a horizontal base;
a plurality of fastening devices for fastening the plurality of feet on the horizontal base,
wherein at least one of the feet is mounted so as to be horizontally movable in relation to one of the fastening devices which fastens the at least one of the feet to the base;
a fixing device, fastened to the base, for fixing the turbomachine at a horizontal fixed point against horizontal movement; and
a guide device, fastened to the base, for restricting the horizontal movement of the turbomachine to a one-dimensional movement,
wherein the one-dimensional movement is directed in a direction parallel to a rotor shaft of the turbomachine.

2. The turbomachine foot unit as claimed in claim 1, wherein at least two of the feet are mounted so as to be horizontally movable independently of one another in relation to the fastening devices.

3. The turbomachine foot unit as claimed in claim 1, wherein the at least one movable foot has a foot plate with a recess, wherein the fastening device fastening the foot to the base is led through the recess, and wherein the foot plate is moved in relation to the fastening device when the foot horizontally moves.

4. The turbomachine foot unit as claimed in claim 3, wherein each fastening device comprises a screw which is led through a sleeve having a collar and which is screwed to the base, the collar pressing the foot plate onto the base.

5. The turbomachine foot unit as claimed in claim 4, wherein the sleeve bears part of a pressure force of the fastening device onto the base.

6. The turbomachine foot unit as claimed in claim 4, wherein a friction-reducing device is introduced between the collar and foot plate.

7. The turbomachine foot unit as claimed in claim 5, wherein a friction-reducing device is introduced between the collar and foot plate.

8. The turbomachine foot unit as claimed in claim 1, wherein the movable foot is mounted so as to be movable away from the horizontal fixed point and toward the horizontal fixed point.

9. The turbomachine foot unit as claimed in claim 1, wherein the fixing device permits vertical movement of the turbomachine.

10. The turbomachine foot unit as claimed in claim 1, wherein the fixing device lies in a vertical mid-plane which runs through the rotor shaft of the turbomachine.

11. The turbomachine foot unit as claimed in claim 1, wherein the fixing device is arranged on a side of the turbomachine which faces a drive.

12. The turbomachine foot unit as claimed in claim 1, wherein the guide device lies in a vertical mid-plane which runs through the rotor shaft of the turbomachine.

13. The turbomachine foot unit as claimed in claim 1, wherein the guide device is arranged on a side of the turbomachine which faces away from a drive.

* * * * *